United States Patent [19]
Anger

[11] 3,748,992
[45] July 31, 1973

[54] MULTIPLE LENS CAMERA FOR OBTAINING TIME SEQUENTIAL IMAGES
[75] Inventor: Hal O. Anger, Berkeley, Calif.
[73] Assignee: The United States of America as represented by the Atomic Energy Commission, Washington, D.C.
[22] Filed: Jan. 22, 1971
[21] Appl. No.: 108,826

[52] U.S. Cl. .................................................. 95/36
[51] Int. Cl. ............................................. G03b 9/08
[58] Field of Search ................................. 95/18, 36

[56] References Cited
UNITED STATES PATENTS
525,439  9/1894  Blackmore ............................. 95/36
3,618,494  11/1971  Betterman ......................... 95/18 P Primary Examiner—John M. Horan
Attorney—Roland A. Anderson

[57] ABSTRACT

A multiple lens photographic camera for recording a plurality of sequential views of time-dependent images, such as the oscilloscope output of a radioisotope camera from which images of the distribution of radioactive material in a living organism may be obtained, comprising a moving opaque curtain shutter system having round or elongated slot apertures, or a combination thereof, therein, a plurality of lenses juxtaposed said shutter system, and a photographic film over-lapping said plurality of lenses; said oscilloscope output, lenses, and photographic film in focus alignment permitting images of a series of light dots appearing on the oscilloscope screen to be formed on different portions of the photographic film in a sequence according to which lens or lenses are uncovered by the shutter apertures and including time over-lapping images.

6 Claims, 4 Drawing Figures

INVENTOR.
Hal O. Anger
BY
ATTORNEY.

INVENTOR.
Hal O. Anger 3,748,992

MULTIPLE LENS CAMERA FOR OBTAINING TIME SEQUENTIAL IMAGES

BACKGROUND OF THE INVENTION

The invention described herein was made in the course of, or under, Contract No. W-7405-ENG-48 with the United States Atomic Energy Commission.

When a radioisotope camera (the subject of U.S. Pat. No. 3,011,057; Hal O. Anger) is used, a radioactive substance that emits gamma-rays is injected into a subject, such as a human patient. The radioisotope camera determines the location at which each gamma-ray originates in the subject, a momentary spot of light being produced on the screen of an oscilloscope associated with the radioisotope camera at a point corresponding to such location. Many such spots are photographically recorded over a period of time producing a composite image of an organ in which the radioactive substance may have collected, or of a channel through which the substance is passing. Frequently, a series of separate images taken at successive or over-lapping time intervals is desirable, either to show a sequence of events, as in the functioning of the heart, or to obtain the best image possible of a portion of the body when the time of passage of the radioactive substance through such portion is not known. In the latter instance, many images are taken over a time period so that at least one image will be recorded at the optimum time. Typically, each image is formed over a two second time period. It is desirable that the image recording mechanism be largely automatic.

There exists multiple lens cameras which reproduce multiple images such as stereo-type cameras or cameras used for mass production or fabrication of semiconductor devices. There also are single lens cameras with multiple apertured shutters where the film moves with the shutter, but there still exists the need for taking a series of time-sequential photographs and/or time-over-lapping photographs with no time interval between the end of one exposure and the beginning of the next exposure on different portions of a stationary film.

SUMMARY OF THE INVENTION

The present invention is a attachment for use with the radioisotope camera described in U.S. Pat. No. 3,011,057, patented November 28, 1961 in the name of Hal O. Anger, and includes apparatus whereby the oscilloscope presentation of the visual output of a radioisotope camera may be permanently recorded. The multiple lens camera comprises a moving opaque curtain shutter mechanism which is stored, rolled, on a feed reel and pulled across an array of 80 lenses in an 8 X 10 matrix of rows and columns by a take-up reel. The opaque curtain contains positioned round or elongated slot apertures, or both, which selectively uncover and re-cover various lenses of individual rows until all lenses of all rows are exposed to the oscilloscope screen. Each lens, as uncovered, focuses the images of the momentary spots of light onto a separate portion of the photographic film. Thus, after each lens has focused an image onto a corresponding section of the film, 80 separate images, time related, are created upon one piece of film. The opaque curtain round apertures permit sequential non-time overlapping exposures whereas the elongated shot apertures are varied in length according to length of exposure time desired (in combination with the moving speed of the curtain) to permit time over-lapping exposures, i.e., the slot length greater than the distance between two consecutive lenses. Round apertures and elongated slot apertures may be selectively combined upon the same opaque curtain to allow a series of sequential non-time overlapping exposures simultaneously with a single time over-lapping exposure.

Accordingly, it is an object of the present invention to provide apparatus for obtaining time-sequential views of time-dependent images formed from momentary bursts of light appearing on the screen of the oscilloscope associated with the radiation camera.

It is also an object of the present invention to provide apparatus for obtaining sequential, time over-lapping views of time-dependent images formed from momentary bursts of light appearing on the screen of the oscilloscope associated with the radiation camera.

Other objects of the present invention not specifically set forth above will become readily apparent to those skilled in the art in view of the following description and accompanying drawings.

DETAILED DESCRIPTION

Figure 1:
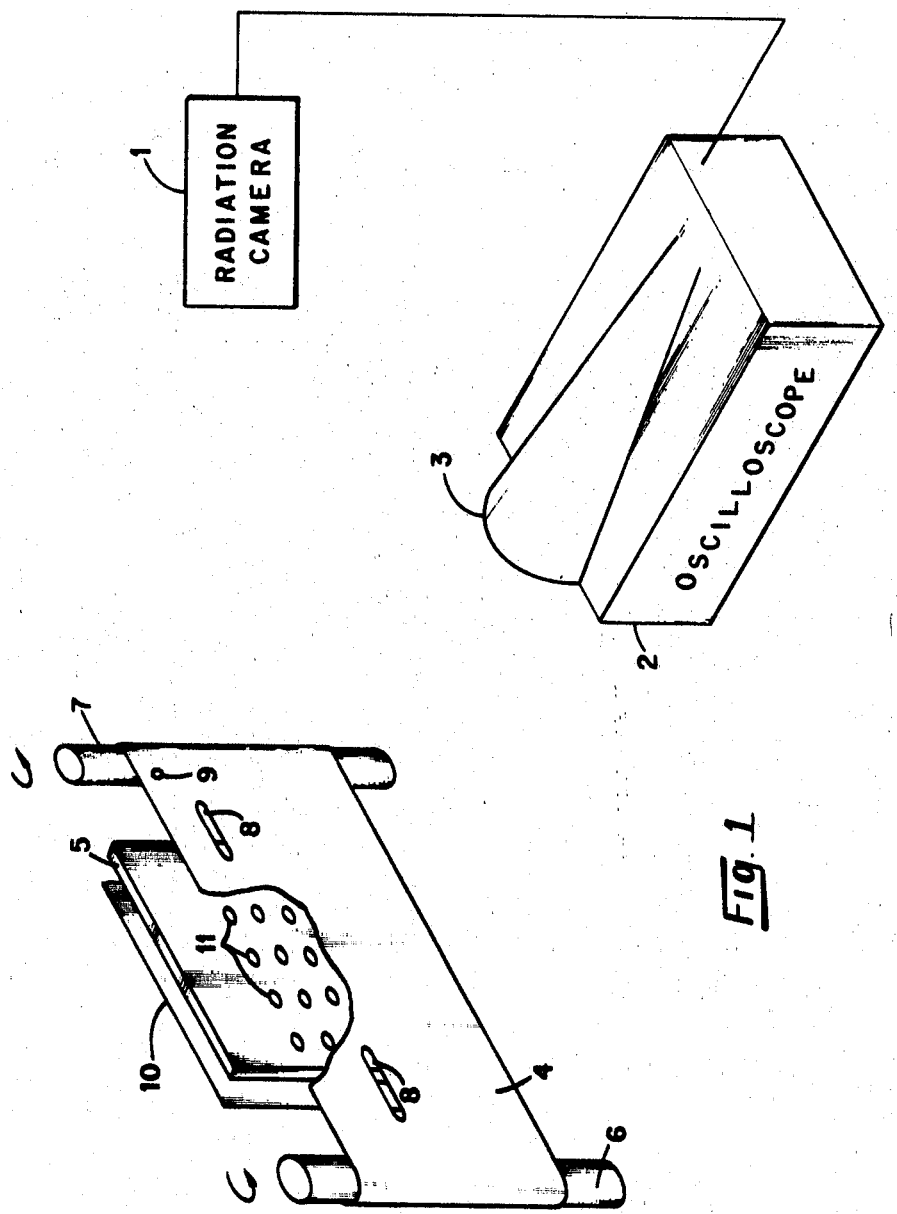
FIG. 1 is a pictorial diagram of the embodiment of the present invention.
Figure 2:
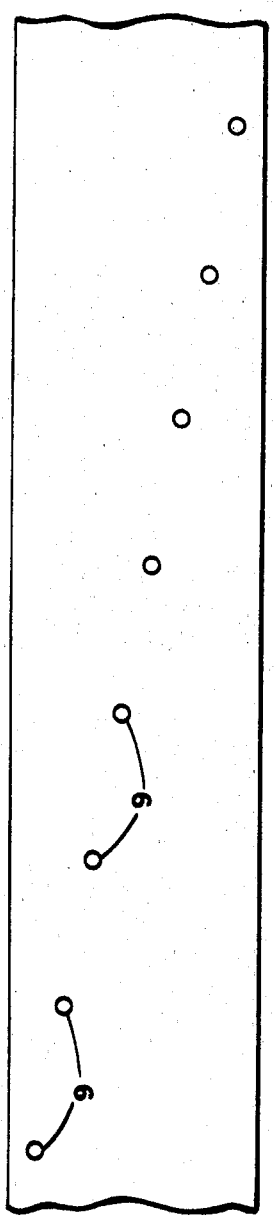
FIG. 2 is a pictorial diagram of the opaque curtain with round apertures for a sequential series of non-time overlapping exposures.

FIG. 1 is an embodiment of the invention comprising the radiation camera 1 to which output is associated oscilloscope 2 for the presentation on the oscilloscope screen 3 of the momentary bursts of light indicating detection of the radioactive substance in the subject patient. Over a short period of time, a composite reproduction of the collection of the gamma-ray emitting radioactive substance in the organ has appeared on the screen 3. An opaque curtain shutter system 4 is located intermediate the oscilloscope screen 3 and the lens mounting board 5. The curtain 4 moves between the feed reel 6 and take-up reel 7 at a selected rate of travel. Round aperture 9 and elongated slot aperture 8 in the opaque curtain 4 move across the lens mounting board 5 as the curtain traverses its path between reels 6 and 7. The lenses 11 for the multiple lens camera are arranged in a rectangular array upon the lens mounting board 5. Light paths are created between the lenses 11 and oscilloscope screen 3 by round aperture 9 or elongated slot apertures 8 which are interrupted by the passing of the apertures in curtain 4. The oscilloscope presentation is focused by lenses 11 upon the photographic film 10 directly behind the lens mounting board 5 to form the composite image of the accumulation of the radioactive substance in the patient's organ. Although the persistance of gamma-ray responding light dot on the oscilloscope screen may be much shorter than the film exposure time, the film does record a permanent image. The photographic image then is built up of these momentary light dots over an exposure time determined by the speed of the opaque curtain and the diameter of the round aperture or the length of the elongated slot aperture, which ever is applicable. The round apertures are normally the diameter of the distance between consecutive lenses in the row which the aperture is to traverse. FIG. 2 illustrates an example of round apertures 9 which move with opaque curtain 4 from left to right to generate a series of individual non-time overlapping exposures. The bottom most aperture will form the first series of exposures wherein each exposure will cover a certain sequential time interval such as $T_0$ to $T_1$, $T_1$ to $T_2$, ... $T_9$ to $T_{10}$. The next aperture in line, depending upon its lateral distance from the previous aperture, may then go from $T_{10}$ to $T_{11}$, $T_{11}$ to $T_{12}$, etc. if the same time base reference is desired or its time interval may be $T_A$ to $T_B$, $T_B$ to $T_C$, ..., where the time interval $T_A$ to $T_B$ equals $T_1$ to $T_2$, but time $T_A$ has a different starting reference, which in fact, may overlap a portion of the total $T_1$ to $T_{10}$ time interval. Obviously, the unrolled length of opaque curtain 4 may be long relative to the length of the rows of lenses.

Figure 3:
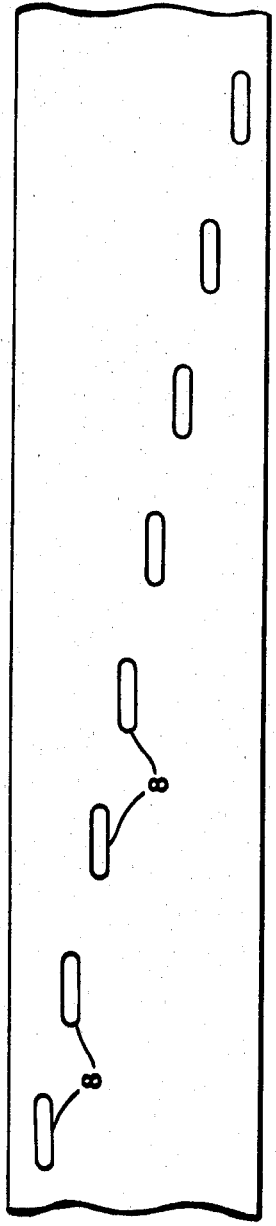
FIG. 3 is a pictorial diagram of the opaque curtain with elongated slot apertures for a sequential series of time overlapping exposures.

The elongated slot apertures are sufficiently long enough to encompass at least two separate lenses simultaneous and thereby permit exposures which are time overlapping, the opaque curtain speed adjusted accordingly in each case. For example, assume that with the elongated slot aperture 8 shown in FIG. 3, light will pass through each lens (not shown) for two seconds when the curtain 4 is moved at a selected speed. At least two lenses will be exposed at all times so that the first image will be formed during the interval $T_0$ to $T_2$, the second image $T_1$ to $T_3$, the third image from $T_2$ to $T_4$, etc., assuring that the image forming intervals overlap in time. Obviously, as the curtain moves from the feed reel across the lens array and to the take-up reel, each elongated slot aperture 8 passes over a row of the lens array and generates the series of sequential time overlapping images individually formed on the photographic film.

Figure 4:
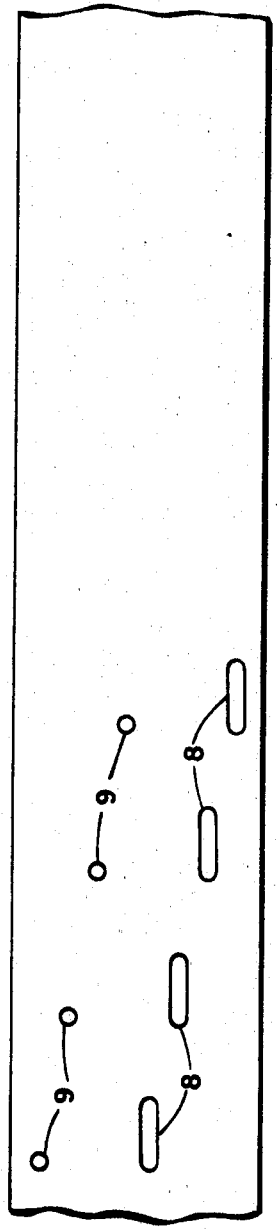
FIG. 4 is a pictorial diagram of the opaque curtain with a combination of round apertures and elongated slot apertures for a sequential series of non-time overlapping exposures simultaneously with time overlapping exposures.

FIG. 4 illustrates the combination of round apertures 9 and elongated slot apertures 8 in opaque curtain 4 wherein the bottom round aperture 9 forms non-time overlapping exposures for time intervals $T_0$ to $T_1$, $T_1$ to $T_2$, $T_2$ to $T_3$, etc., while the bottom elongated slot aperture 8 simultaneously forms time overlapping exposures for time intervals $T_0$ to $T_2$, $T_1$ to $T_3$, $T_2$ to $T_4$, etc. Thus, the composite information of the first two non-time overlapping exposures is contained in the first time overlapping exposure. Similarly for the second and third non-time overlapping exposures and the composite second time-overlapping exposure.

The degree of overlap, if any, and the time interval over which each time overlapping image is formed may be easily varied by changing the length of the elongated slot apertures 8 and/or by changing the shutter mechanism opaque curtain 4 speed. In addition, the construction of the camera could be varied so that the shutter mechanism is disposed between the lenses 11 and the photographic film 10.

Although the foregoing embodiment has been described in detail, it is readily apparent that many other embodiments and variation in the camera apparatus can be made without departing from the spirit, scope, or principle of the invention. For example, although the shape of the apertures for the case of sequential non-time overlapping exposures have been hereinbefore indicated as being round, it will be appreciated that apertures of other configurations having a comparable horizontal width may be alternatively employed in the described shutter system opaque curtain. Therefore, this invention is not to be limited except in accordance with the scope of the appended claims.

I claim:

1. A multiple lens camera for obtaining time-sequential images comprising:
   a shutter system including an opaque curtain containing a plurality of apertures for selectively passing light therethrough,
   a plurality of lenses arranged in rows and juxtaposed said shutter system, and
   a photographic film in focus alignment with said lenses for receiving light images thereon through said apertures,
   said curtain being operable to traverse said plurality of lenses to progressively uncover and recover said lenses of each row aligned with each aperture, at least one of said apertures being an elongated slot of such length that at least two of said plurality of lenses may be uncovered simultaneously as said elongated slot aperture traverses said row of lenses to expose said photographic film to time overlapping sequential light images.

2. The multiple lens camera as defined in claim 1, further including a plurality of elongated slot apertures in said curtain, wherein said elongated slot apertures are staggered in said curtain such that as one slot traverses one row of lenses, another aperture is just beginning its traversal over a different row of lenses.

3. The multiple lens camera as defined in claim 1 wherein said curtain includes at least one round aperture in combination with said one elongated slot aperture for exposing said photographic film to individual time sequential light images simultaneously with time overlapping sequential light images.

4. The multiple lens camera as defined in claim 1, further including means for storing said opaque curtain on one feed reel proximate said plurality of lenses and pulled across said lenses by a take-up reel.

5. A multiple lens camera for obtaining time-sequential images comprising:
   a shutter system including an opaque curtain containing a plurality of apertures for selectively passing light therethrough,
   a plurality of lenses arranged in rows and juxtaposed said shutter system, and
   a photographic film in focus alignment with said lenses for receiving light images thereon through said apertures,
   said curtain being operable to traverse said plurality of lenses to progressively uncover and recover said lenses of each row aligned with each aperture, at least one of said apertures having a length in the direction of curtain movement equal to the distance between two consecutive lenses.

6. The multiple lens camera as defined in claim 5 wherein said curtain includes a plurality of apertures, said apertures being staggered in said curtain such that as one aperture has traversed one row of lenses, another aperture is just beginning its traversal over a different row of lenses.

* * * * *